United States Patent [19]

Van Horeebeck

[11] Patent Number: 5,655,960

[45] Date of Patent: Aug. 12, 1997

[54] METHOD AND DEVICE FOR SPLITTING AN ANIMAL CARCASS

[75] Inventor: Jean Van Horeebeck, Aubenas, France

[73] Assignee: Durand International (Societe Anonyme), France

[21] Appl. No.: 710,529

[22] Filed: Sep. 18, 1996

[30] Foreign Application Priority Data

Sep. 18, 1995 [FR] France .................... 95 11126

[51] Int. Cl.$^6$ ........................................ A22B 5/20
[52] U.S. Cl. ................................ 452/160; 452/149
[58] Field of Search ........................ 452/160, 149

[56] References Cited

U.S. PATENT DOCUMENTS

| 4,667,368 | 5/1987 | Menqi | 452/160 |
| 4,970,756 | 11/1990 | Durand | 452/160 |
| 5,141,471 | 8/1992 | Bekkers | 452/160 |
| 5,421,772 | 6/1995 | Durand | 452/160 |

FOREIGN PATENT DOCUMENTS

| 2551950 | 3/1985 | France . | |
| 26 00 766 | 7/1976 | Germany . | |
| 644440 | 1/1979 | U.S.S.R. | 452/160 |

*Primary Examiner*—Willis Little
*Attorney, Agent, or Firm*—Bacon & Thomas

[57] ABSTRACT

This invention concerns a cutting device for use in slaughtering animals, wherein:

the swinging bar is associated with a position sensor assessing the back-pivoting of the swinging bar corresponding to the escape of the lower roller with respect to the lower end of the carcass, the swinging bar is connected to an actuator whose functioning is controlled by the detector to provoke displacement of said bar in the direction for which it pushes the carcass and moves it away from the cutting member before the latter reaches the lower end.

The invention is applicable to limiting the splitting of carcasses to the major part of the spine.

14 Claims, 4 Drawing Sheets

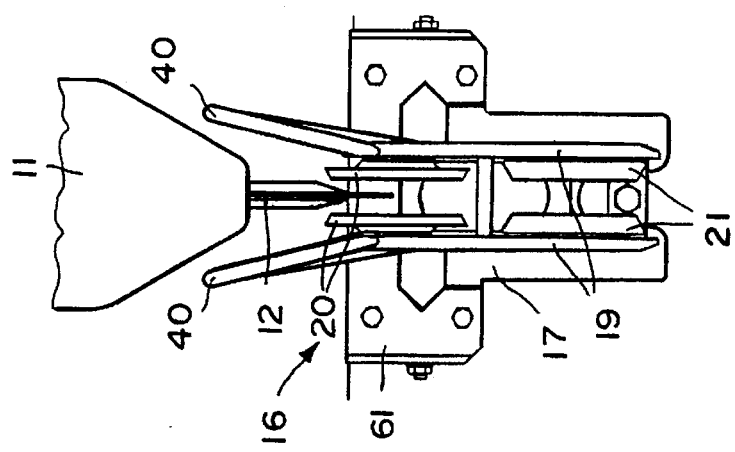
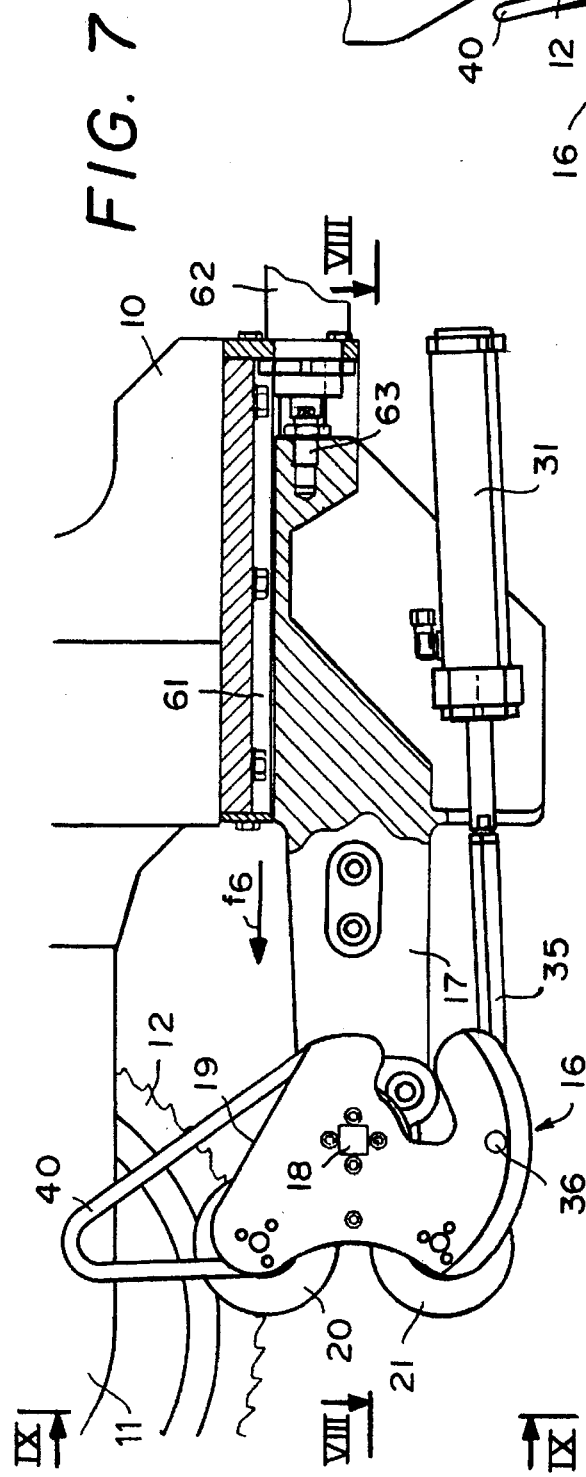
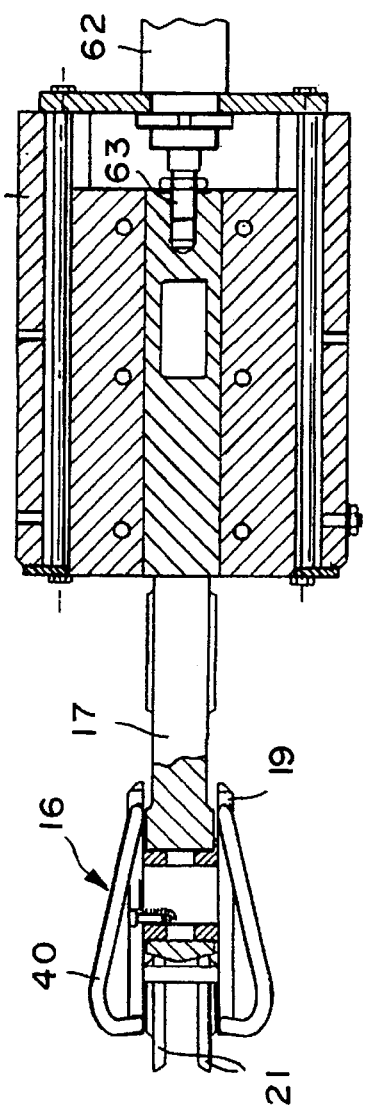

METHOD AND DEVICE FOR SPLITTING AN ANIMAL CARCASS

FIELD OF THE INVENTION

The present invention relates to the general domain of slaughtering animals and more particularly to the operation of cleaving or splitting a carcass after the phase of evisceration.

More specifically, the object of the invention concerns the splitting of carcasses of animals such as swine, sheep or cattle.

BACKGROUND OF THE INVENTION

The operation of splitting or cleaving an animal carcass has always been effected by suspending the carcass vertically by its rear legs and carrying out the splitting operation along the spine by means of a cutting tool such as a foil or blade initially displaced by hand.

This traditional technique has, for some time, already been replaced by an automatic splitting method allowing work rates compatible with the requirements of industrial slaughter-houses to be attained.

Such a method consists in advancing the carcasses, suspended via a conveyor or the like, in front of an intervention station consisting of an automatic machine comprising a cutting member which may be introduced between the rear legs of the suspended carcass in order to act along a vertical cutting plane, effecting the split into two half-carcasses.

The splitting operation may be carried out at a stationary station or when moving, i.e. combining the vertical displacement of the cutting member with the lateral displacement of the carcass when the conveyor advances continuously.

The known methods and installations for carrying out this operation are satisfactory and enable an animal carcass to be split into two half-carcasses which are separated so as to be subsequently directed towards appropriate intervention stations.

Depending on the subsequent methods of treatment or the means employed for suspending the carcass on the conveyor, it is sought to split the carcass, leaving a join at the terminal part or lower end thereof. In other words, splitting is voluntarily limited to the major part of the carcass without, however, attaining the whole, in order to avoid having two separate half-carcasses.

Such is the case, for example, when the carcass is suspended from the conveyor via a support of the pendular type presenting only one articulation for a single suspension hanger, at the ends of the arms of which the rear legs of the carcass are fixed.

In such a configuration, a total split produces two half-carcasses which make an uncontrollable pendular movement having a detrimental effect on the stability procured by the suspension member.

In such a case, which is given only by way of illustration, it is clear that it is necessary, in order to maintain stability and subsequent take-up, to split the carcass only over the major part thereof, leaving a join at the lower end.

It should be considered that this lower end may be the animal's head if this part remains, or the lower terminal part of the spine if the head has been removed.

In either case, the same requirement is imperative.

The presently known methods and devices for automatically splitting an animal carcass do not respond to this requirement and do not enable the split to be interrupted at a determined distance from the lower end of the animal, due to rapid presentation with a relatively high frequency of succession and the necessity to take into account the random position of the lower end of each carcass, which depends on the length of the slaughtered animal.

The need has therefore been felt in industrial slaughter-houses having to comply with such a requirement, to have available means for making an automatic split limited to a distance from the lower end of the suspended carcass, adopting a high work rate and acting entirely automatically, whatever the length of the carcasses arriving at the intervention station.

It is an object of the present invention to respond to such a need.

SUMMARY OF THE INVENTION

To that end, it proposes a method for splitting an animal carcass, characterized in that, in order to interrupt splitting at a distance from the lower end of the carcass, it consists in:

detecting the lower end by anticipation, employing the detection to control a mobile member relatively to the cutting member and located therebeneath, displacing the mobile member to act on the suspended carcass and to move it away from the cutting member in the plane of action of said member.

The invention also relates to a device for carrying out such a method, such a device being characterized in that:

the swinging bar of the inner guiding member is associated with a position sensor assessing the back-pivoting of the bar corresponding to the escape of the lower roller with respect to the lower end of the carcass, the swinging bar is connected to an actuator whose functioning is controlled by the detector to provoke displacement of said bar in the direction for which it pushes the carcass and moves it away from the cutting member before the latter reaches the lower end.

BRIEF DESCRIPTION OF THE DRAWINGS

The invention will be more readily understood on reading the following description with reference to the accompanying drawings, in which:

FIG. 7 is an elevation with parts torn away, illustrating in greater detail a variant of the means according to the invention.

FIG. 8 is a section taken along line VIII—VIII of FIG. 7.

FIG. 9 is a transverse view taken along line IX—IX of FIG. 7.

DESCRIPTION OF PREFERRED EMBODIMENT

Figure 1:
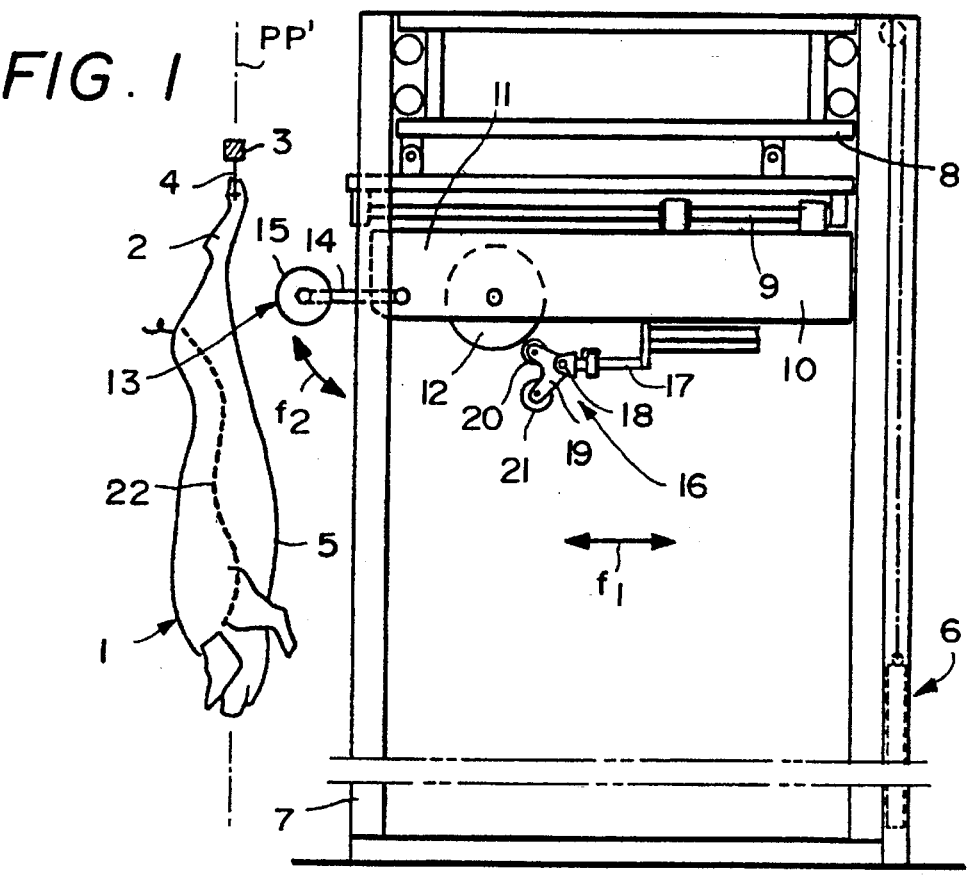
FIG. 1 is a schematic elevation of an installation for carrying out the method according to the invention.

Referring now to the drawings, FIG. 1 shows an installation for splitting an animal carcass 1 suspended by its rear legs 2 from a continuously or discontinuously advancing conveyor 3. Conveyor 3 is of appropriate shape and construction to suspend and displace the carcass 1 via a suspension hanger 4, at the ends of which the rear legs 2 are hooked.

Carcass 1 is suspended so that it presents its ventral face 5 opposite the intervention stations of the slaughter line among which is located a splitting station 6 which includes a frame 7 capable of guiding a chassis 8 which may be displaced vertically from an upper position, as shown, to a lower position by conventional drive means which have not been illustrated and which do not directly form part of the object of the invention.

Chassis 8 supports, via guiding members 9 such as slideways, a carrieage 10 which may be animated by a reciprocating displacement in the direction of arrow $f_1$ by known drive means (not shown). These means are for example formed by a rack and a toothed pinion driven by a motor with two directions of rotation, the rack being for example borne by the carriage 10 while the motor is borne by chassis 8. The direction of displacement ($f_1$) is considered as perpendicular to the plane P-P' of displacement of the carcass 1.

Carriage 10 comprises a rigid beam 11 bearing a cutting member 12 which is constituted by a circular saw capable of being driven in rotation by a drive member borne by beam 11 and not shown. Such a member and its mode of connection to the saw must in fact be considered as having formed the subject matter of numerous available publications. These means do not form a direct part of the invention.

Beam 11 bears at its front terminal part, i.e. the one oriented towards plane P-P', a so-called outer guiding assembly 13, composed of an arm 14 bearing an assembly of rollers 15 and capable of being animated by a displacement in the direction of arrow $f_2$ from the stable standby position as illustrated in FIG. 1.

Beam 11 also bears, below and slightly recessed with respect to the cutting member 12, a so-called inner guiding assembly 16 composed of an arm 17 bearing, via a horizontal pivot pin 18, a swinging bar 19 supporting superposed rollers 20 and 21.

From the position illustrated in FIG. 1, the method of splitting a carcass is carried out as follows, considering, for greater facility, that this operation takes place at a fixed station, i.e. the carcass 1 is stopped by the conveyor 3 opposite the splitting station 6 in a position of suspension considered stable. It goes without saying that, in a variant embodiment, the splitting operation may be carried out when the carcass is moving, i.e. involving a vertical displacement associated with a lateral displacement made in synchronism with that of the carcass constantly advanced by the conveyor.

Figure 2:
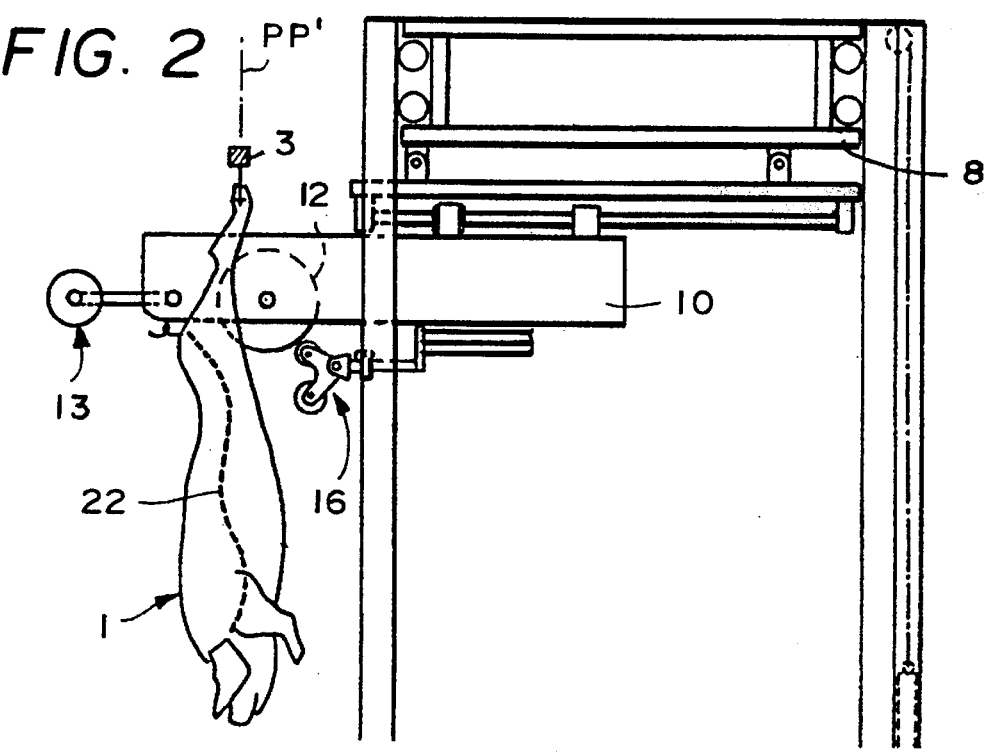
FIGS. 2 and 3 are views illustrating particular phases of carrying out the invention on the basis of the same schematic representation.
Figure 3:
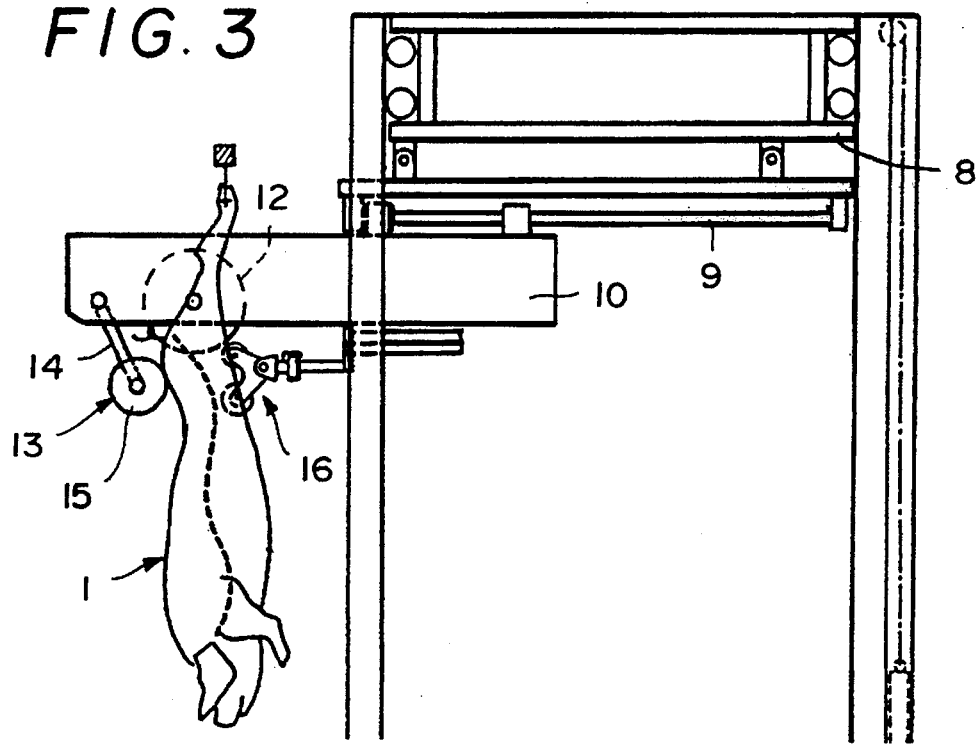

The carriage 10 is then animated by a displacement causing the beam 11 to emerge and traverse the plane P-P', so that the saw 12 is placed plumb with the animal's spine or backbone 22, being located between the rear legs. As illustrated in FIGS. 2 and 3, in this step, the rollers 20 and 21 of the member 16 are oriented in abutment against the inner dorsal face along the spine 22 for inner guiding of the carcass with respect to the cutting member 12.

FIG. 3 shows that, in a following step, the arm 14 is pivoted so as to press the roller system 15 on the dorsal face of the carcass antagonistically with respect to the guiding member 16. The function of the rollers 15 is to ensure, by an abutment on either side of the spine, an outer guiding of the carcass with respect to the cutting member 12.

In this state, the cutting member 12 is rotated and the chassis 8 is simultaneously animated by a descending movement. During this displacement, the guiding member 16 follows the natural shape of the inner dorsal face of the carcass via the pivot pin 18 while, simultaneously, the system of outer guiding rollers acts similarly, following the shape of the outer dorsal face of the carcass.

Figure 4:
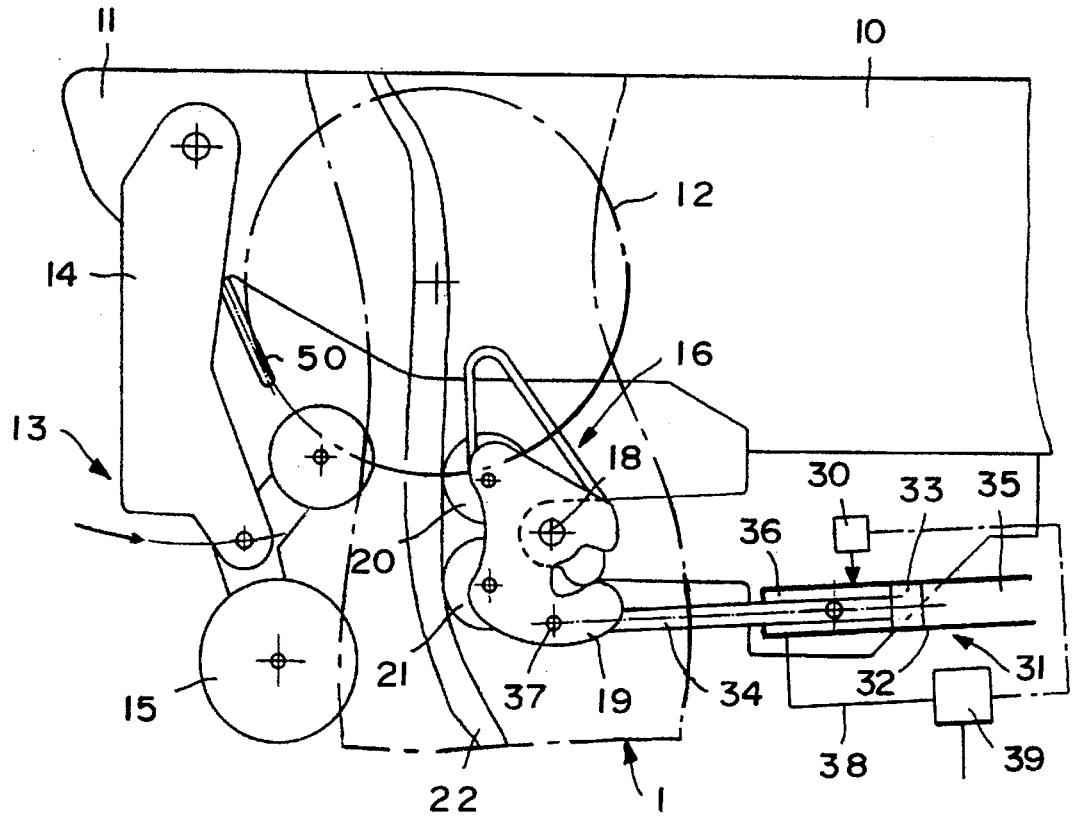
FIGS. 4 and 6 are three views illustrating, on a larger scale, the method and, in part, the device for carrying it out in accordance with the invention.

As shown in FIG. 3, but also in FIG. 4, the result of the vertical displacement of the cutting member 12 is to split the carcass at the level of the spine but also of the outer dorsal part thereof and it will consequently be understood that, if this operation is carried out without any other limitation up to the lower part of the carcass, the latter will be split into two separate half-carcasses.

To avoid such a result in the cases considered as stated hereinabove, it is recommended, within the meaning of the invention, to detect by anticipation the lower end of the carcass. Anticipation should be understood to mean that detection precedes the action of the cutting member. The method according to the invention therefore consists in determining the presence of the lower end before the cutting member actually reaches it.

The method according to the invention then consists in turning to account the detection of this lower end to control a mobile member which will move the suspended carcass away from the zone of action of the cutting member sufficiently for the latter to be prevented from acting at the lower end of the carcass.

Figure 5:
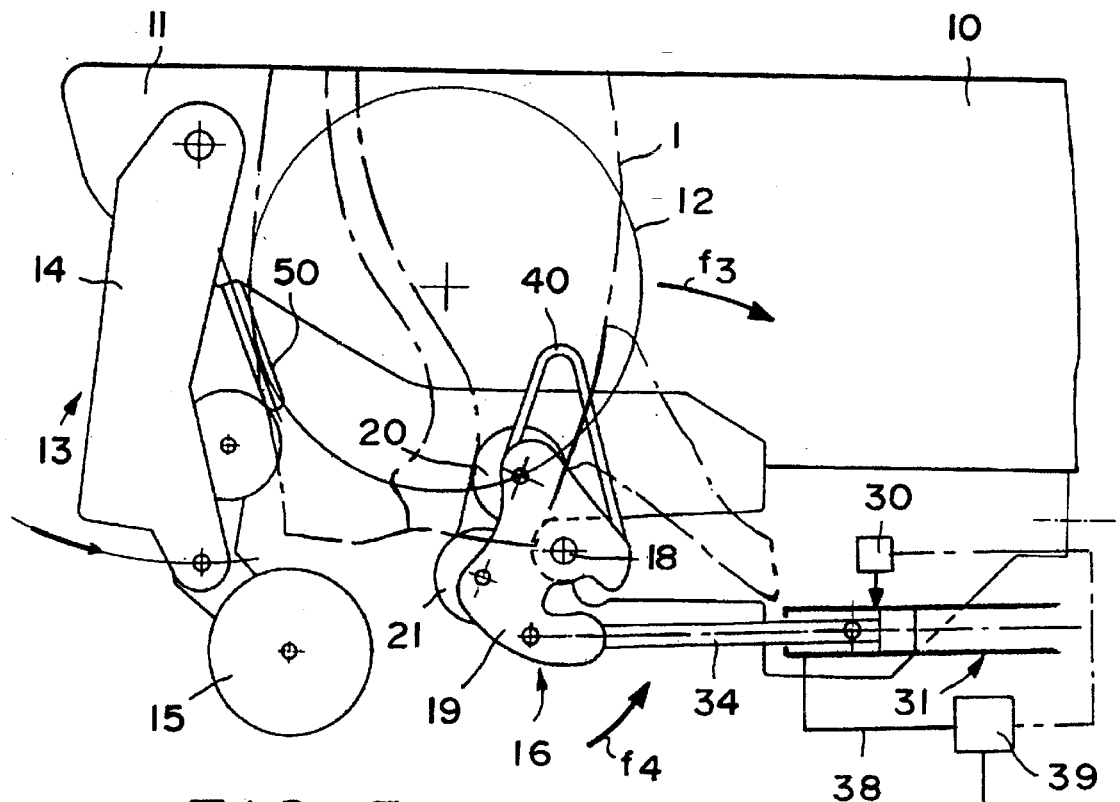
Figure 6:
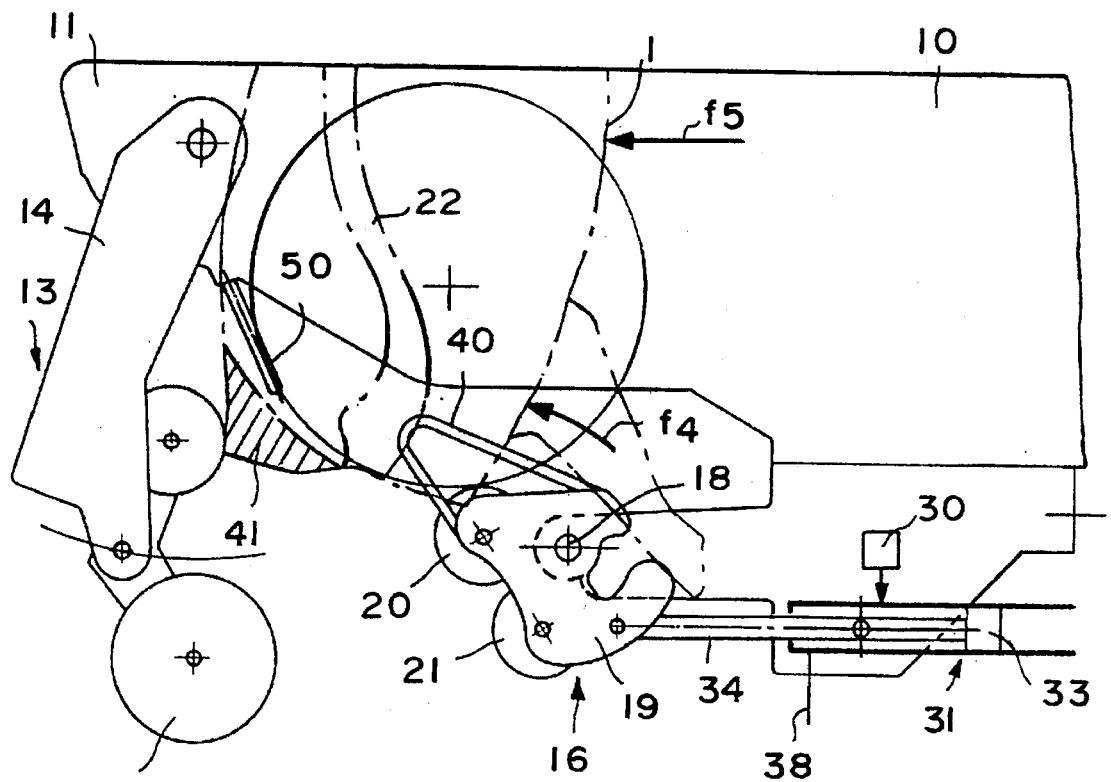

In order to carry out these operational phases as illustrated in FIGS. 4 to 6, it is provided to interpose, between the beam 11 or the carriage 10 or the arm 17 and the swinging bar 19 of the inner gliding member, a detector 30 and a control means 31. Advantageously, but not necessarily for carrying out the invention, the detector 30 and the control member 31 form one body and are constituted by an actuator of rectilinear type such as a single- or double-effect jack incorporating a position sensor for example formed by a magnetic link between the cylinder 32 and the piston 33 of the piston rod 34. The sensor may also be constituted by a detector detecting the variation in the pressure of a supply fluid prevailing in the chamber 35 of the jack opposite the chamber 36 traversed by the piston rod 34 which is connected by a pin 37 to the lower part of the swinging bar. The detector-actuator assembly may, more simply, also employ an elastic reaction imposed on a spring placed in relation with the swinging rod or a jack or the like which is associated therewith.

The actuator 31 may be of the pneumatic or hydraulic type and its single- or double-effect supply circuit, such as 38, is placed under the dependence of a distributor 39 whose functioning is servo-controlled by detector 30.

In view of the shape of the inner dorsal face of the carcass, the detector 30 allows a non-response range corresponding to the usual pivoting amplitude of the swinging rod 19 having to follow the local shape of the spine or backbone 22.

When, from the position illustrated in FIG. 4, the descending displacement of carriage 11 brings member 16 near the lower end of the carcass, constituted in the example by the cervical part in the absence of a head, the lower roller 21 escapes the carcass as illustrated in FIG. 5, with the result that the swinging bar 19 is pivoted back in the direction of arrow $f_3$ over an angular range clearly greater than that of fluctuation which it meets when following the spine.

The back-pivoting in the direction of arrow $f_3$ activates the sensor 30 which servo-controls the distributor 39 so as to ensure supply of the chamber 36 of the actuator 31 in order to control, in response to this back-pivoting, a forward pivoting in the direction of arrow $f_4$ as illustrated in FIG. 6. Such forward pivoting makes it possible to apply, on the inner dorsal face, terminal parts or extensions 40 of the swinging bar, with the result that, by this action, the pendular mass, constituted by the partly split carcass, is displaced in the direction of arrow $f_5$ to move the non-split lower end 41 from the zone of action of the cutting member 12.

In order to perform this function, the extensions 40 are for example constituted by hoops extending laterally with respect to the upper roller system 20 in order to be able to abut on either side of the inner backbone of the spine.

In this way, the descending displacement of the carriage 11 enables the end lower part 41 to escape from the zone of action of the cutting member 12 and the splitting of the carcass to be limited so as to leave a zone of connection between the half-carcasses which are otherwise separated.

As is shown more precisely in FIG. 6, it is provided to place on the lower face of the terminal part of the beam 11, a guard 50 arranged in front of the cutting member 12 so as to be interposed between it and the non-cut zone 41 in the terminal phase of the descent. During this terminal phase, it must be understood that the guard 50 is the only member ensuring internal guiding of the carcass with respect to the cutting member 12. In fact, in terminal phase of the descent, the extensions 40 of the swinging bar are in abutment on the split parts of the carcass. The guard 50 acts on the non-cut end part 41, effecting a pull on the carcass in the direction of arrow $f_5$ greater than the thrust exerted by the guiding assembly 13. Of course, it is clear that the displacement of the carcass in the direction of arrow $f_5$ by the swinging bar must be sufficient to bring the non-cut end part 41 between the guard 50 and the roller assembly 15. The use of the guard 50 avoids any risk of accidental total splitting resulting from the carcass making a pendular swinging movement which is difficult to control.

At the end of the descending stroke, the action of the guard 50 is favoured by a control of the arm 14 aiming at reducing the pressure exerted on the outer dorsal face or at raising it up to the reference position shown in FIG. 1 or withdrawal stroke of the beam 11 which may occur, depending on the cases, either immediately or after at least a beginning of ascending stroke of the chassis 8.

The jack 31 is supplied with a fluid delivered at a pressure such that the force of action of the swinging bar 19 is greater than that of application of the rollers 15 against the outer dorsal face via the arm 14. In this way, the carcass may be moved away without being hindered by the action of the guiding member 13 which is subjected to a concomitant pivoting over an angular amplitude corresponding to the action of moving away exerted by the swinging bar 19.

It must, of course, be considered that the detection means allotted to the swinging bar 19 which, in the example, performs a double function, may be constituted by different means independent of the actuator 31 which may for example be of optical nature, being influenced directly or indirectly by the swinging bar.

FIGS. 7 to 9 illustrate a variant embodiment wherein it is provided to subject the inner guiding member 16 to a displacement in the direction of arrow $f_6$ in response to a back pivoting for detection of the lower end of the carcass, as stated hereinabove.

In such a variant, the inner guiding member 16 is borne by the end of the arm 17 which is mounted on the beam 11 via a slideway 61. The arm 17 is connected to an actuator 62, constituted for example by a jack whose body is fixed to the beam 11, to the carriage 10 or to a flange of the slideway 61 and whose rod such as 63 is adapted on the rear part of the arm 17.

The back-pivoting detector is for example of the same type as or possibly a technical equivalent of the one described in relation with FIG. 4.

The operational principle is similar to the one described hereinabove in that, by activation of the detector 30 during the back pivoting of the swinging bar 19, supply of member 62 is ensured so as to displace arm 17 in the direction of arrow $f_6$ for the swinging bar and/or the extensions 40 to act on the inner dorsal face of the carcass to push and move the latter away from the zone of action of the cutting member 12.

FIG. 7 shows that, in the variant as described, it is provided to constitute the detector 30 in the same manner as in the example according to FIG. 4, so as likewise to employ the actuator 31 whose task is to urge the swinging bar 19 in the forward displacement described and concomitantly, with or without phase shift, with respect to the displacement of the arm 17 in the direction of arrow $f_6$.

Although it has not been described, it goes without saying that the supply or supplies of actuators such as 31 and 62 are then reversed so that the swinging rod 19 and the arm 17 resume their initial position at the end of the splitting cycle, when for example the drive members acting on the chassis 8 are controlled to displace the latter towards its upper standby position as illustrated in FIG. 1. Such a displacement is accompanied by a withdrawal of the carriage 10 to extract the member 12 with respect to the plane P-P'.

As has just been described, the method and the device according to the different variant embodiments proposed by the invention make it possible to split an animal carcass automatically and at a high rate, leaving a terminal part not cut so as to maintain a physical link between the two half-carcasses and consequently promote their common, simultaneous displacement or guiding via the conveyor 3 towards the subsequent intervention stations.

The invention is not limited to the examples described and shown, as various modifications may be made thereto without departing from its scope.

What is claimed is:

1. A method for splitting the carcass of an animal suspended from a conveyor by its rear legs, of the type consisting in introducing a cutting member between the rear legs, in applying against the inner dorsal face of the carcass an inner guiding member formed by a swinging bar mounted to pivot on a horizontal pin and bearing two superposed guiding rollers, in pressing against the outer face of the carcass an outer guiding member incorporating rollers acting against the inner guiding member, in setting the cutting member in operation and in displacing the assembly along a vertical cutting plane, wherein, in order to interrupt splitting at a distance from the lower end of the carcass, said method further comprising:

detecting the lower end by anticipation, employing the detection to control a mobile member relatively to the cutting member and located therebeneath, displacing the mobile member to act on the suspended carcass and to move it away from the cutting member in the plane of action of said member.

2. The method of claim 1, wherein the lower end of the carcass is detected by anticipation by the pivoting of the swinging bar due to the escape of its lower roller with respect to said lower end.

3. The method of claim 1, wherein the pivoting of the swinging bar is employed to move the carcass away by a controlled reverse pivoting of the swinging bar.

4. The method of claim 1, wherein the pivoting of the swinging bar is employed to control supply of an actuator provoking extension of a mobile arm supporting the swinging bar.

5. The method of claim 3, wherein the carcass is moved away by the combined action of controlled reverse pivoting of the swinging bar and of extension of its mobile support arm.

6. The method of claim 1, wherein a guard is employed in front of the cutting member, borne by the beam to relay the mobile member and to push the carcass by abutting on the non-cut part of the carcass.

7. A device for splitting an animal carcass suspended from a conveyor by its rear legs, comprising a vertically mobile chassis; a bearing beam mounted to move horizontally with respect to the chassis to be guided, from a retracted position, to traverse a vertical displacement plane followed by the carcass to be split; a cutting member borne by the beam; a retractable outer guiding member borne by the front part of the beam to be applied on the outer dorsal face of the carcass and an inner guiding member borne by the beam to be located beneath the cutting member; a swinging bar mounted to pivot on a horizontal pin and bearing two assemblies of superposed idle rollers;

- a position sensor for assessing the back-pivoting of the swinging bar corresponding to the escape of the lower roller with respect to the lower end of the carcass and
- an actuator connected to the swinging bar, said actuator being controlled by the detector to provoke displacement of said bar in the direction for which it pushes the carcass and moves it away from the cutting member before the latter reaches the lower end, whereby the action of the cutting member is interrupted at a distance from the lower end of the carcass.

8. The device of claim 7, wherein the swinging bar is associated with a detector which performs a function of actuator.

9. The device of claim 8, wherein the actuator is interposed directly between the swinging bar and the beam and is associated with a sensor adapted to control its functioning in the direction for which it provokes a forward pivoting of the swinging bar in response to a back pivoting.

10. The device of claim 9, wherein the swinging bar comprises at least one extension elevated and recessed with respect to and above the upper roller to act on the inner dorsal face of the carcass during the forward pivoting of the swinging bar.

11. The device of claim 7, wherein the swinging bar is mounted at the end of a mobile support arm borne, via a slideway, by the beam with the interposition of the actuator.

12. The device of claim 11, wherein the actuator is constituted by a jack whose supply depends on the position sensor of the swinging bar.

13. The device of claim 7, wherein the actuator develops a force greater than the force of application of the outer guiding member on the outer dorsal face of the carcass.

14. The device of claim 7, wherein the swinging bar is disposed below the cutting member which is constituted by a circular saw borne by the beam which is provided at its front part with a rigid guard extending in front of the saw to act on the non-split lower end part of the carcass.

* * * * *